Jan. 3, 1967 S. C. BELL 3,296,249
5-MONOCYCLIC ARYL-1,3-DIHYDRO-2H-1,4-BENZODIAZEPIN-2-ONES
Filed June 4, 1963
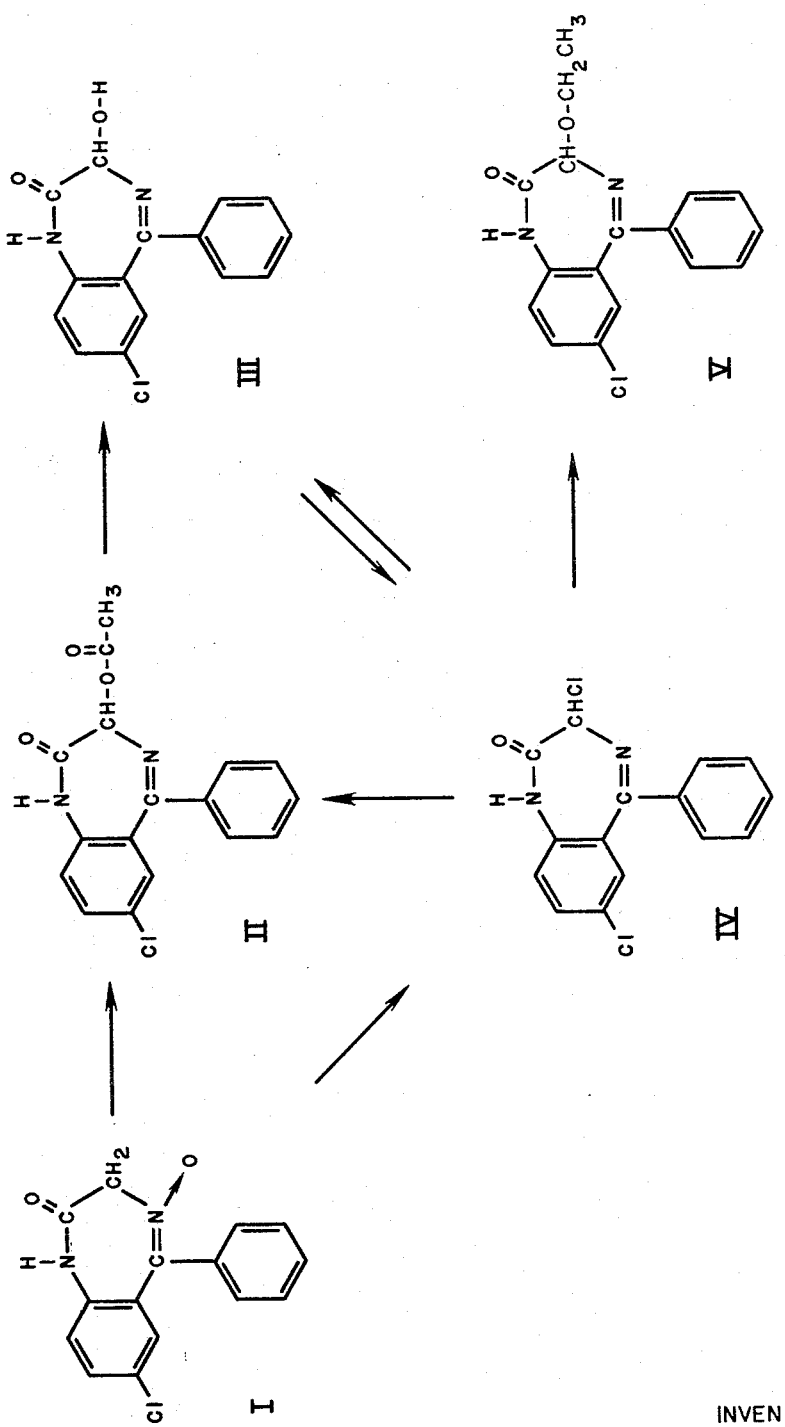
INVENTOR
STANLEY C. BELL 3,296,249
5-MONOCYCLIC ARYL-1,3-DIHYDRO-2H-1,4-BENZODIAZEPIN-2-ONES
Stanley C. Bell, Philadelphia, Pa., assignor to American Home Products Corporation, New York, N.Y., a corporation of Delaware
Filed June 4, 1963, Ser. No. 285,500
34 Claims. (Cl. 260—239.3)

This application is a continuation-in-part of my copending application Serial No. 177,174, filed March 5, 1962, which is a continuation-in-part of my copending application Serial No. 134,569, filed August 29, 1961, both now abandoned.

This invention relates to compositions of matter classified in the art of chemistry as substituted benzodiazepin-2-ones, to intermediates therefor, and to processes for making and using such compositions.

The invention sought to be patented in its composition aspect, is described as residing in the concept of a chemical compound having a molecular structure of the 5-monocyclic aryl-1,3 - dihydro-2H-1,4 - benzodiazepin-2-one nucleus to which there is attached to the carbon atom at the 3-position a hydroxy radical or group convertible thereto, and intermediates in the production thereof.

The invention sought to be patented in a process of making aspect, is described as residing in the concept of a sequence of reactions including: converting a 5-monocyclic aryl-1,3-dihydro-2H-1,4-benzodiazepin-2-one 4-oxide to a 3-acyloxy-5-monocyclic aryl-1,3-dihydro-2H-1,4-benzodiazepin-2-one by treating with an acylating agent; and selectively hydrolyzing to remove the corresponding acyl group while retaining the benzodiazepin-2-one nucleus.

The invention sought to be patented in a second process of making aspect, is described as residing in the concept of a sequence of reactions including: converting a 5-monocyclic aryl-1,3-dihydro-2H - 1,4-benzodiazepin-2-one 4-oxide to a 3-halo-5-monocyclic aryl-1,3-dihydro-2H-1,4-benzodiazepin-2-one by treating with an acyl halide or an alkyl haloformate; and replacing the 3-halo group with a substituent connected through an oxygen atom.

The invention sought to be patented in a process of using aspect, is described as residing in the concept of using the tangible embodiments of a composition of matter having a molecular structure in which there is attached to the 3-position of a 5-monocyclic aryl-1,3-dihydro-2H-1,4-benzodiazepin-2-one nucleus a hydroxy group or a group convertible thereto, by administering to a mammal such a composition as the essential active ingredient of a pharmaceutical formulation for the application of psycholeptic therapy to said mammals.

The tangible embodiments of the composition aspect of the invention possess the inherent general physical properties of being high melting, white crystalline solids; are substantially insoluble in water; and, are soluble in polar solvents, such as lower aliphatic alcohols. Examination of the compounds produced according to the hereinafter described process reveals, upon ultraviolet and infrared spectrographic analysis, spectral data confirming the molecular structure hereinbefore set forth. For example, the C—O frequency characteristic of the oxygen attached at the 3-position is evident. The aforementioned physical characteristics, and the mode of synthesis, confirm the structure of the compositions sought to be patented.

The tangible embodiments of the invention possess the inherent applied use characteristics of exerting a psycholeptic effect in mammals, as evidenced by clinical evaluation according to standard test procedures.

As used herein, the term "group convertible to a hydroxy ralical" means a conventional derivative of an alcohol, such as, for purposes of illustration, but without limiting the generality of the foregoing, ethers in which the oxygen is attached to an alkyl group, an aralkyl group, or an aryl group, for example, methyl, ethyl, isopropyl, n-hexyl, benzyl, and phenyl, and esters in which the oxygen is attached to an acyl group of a carboxylic acid, for example, acetyl, propionyl, caproyl, benzoyl, toluyl, phenylacetyl, β-phenylpropionyl, cinnamoyl, aminoacetyl, aminobenzoyl, carbamoyl, morpholinoacetyl, chloroacetyl, chlorobenzoyl, and bromobenzoyl.

The manner and process of making and using the invention will now be generally described so as to enable a person skilled in the art of chemistry to make and use the same as follows:

The new processes of my invention are illustrated schematically for certain specific embodiments thereof in the figure.

On gentle warming of a 5-monocyclic aryl-1,3-dihydro-2H-1,4-benzodiazepin-2-one 4-oxide (I) with an acylating agent such as a carboxylic acid halide, an acid anhydride, or isopropenyl acetate, I have found, unexpectedly the oxygen migrates to an adjacent saturated carbon atom without cleavage of the heterocyclic ring and there is formed in very high yield a 3-oxygenated-5-monocyclic aryl-1,3-dihydro-2H-1,4-benzodiazepin-2-one (II). When the reagent employed is an organic acid anhydride, the product is a 3-acyloxy-5-monocyclic aryl-1,3-dihydro-2H-1,4-benzodiazepin-2-one (II). When the reagent is a hydrocarbon carboxylic acid halide, the product ordinarily is a mixture of a 3-acyloxy-5-monocyclic aryl-1,3-dihydro-2H-1,4-benzodiazepin-2-one (II) and a 3-halo-5-monocyclic aryl-1,3-dihydro-2H-1,4-benzodiazepin-2-one (III) with the former predominating. However in the special case when the rearrangement agent is an alkyl haloformate, the product recovered is a 3-halo-5-monocyclic aryl-1,3-dihydro-2H-1,4-benzodiazepin-2-one. The 3-acyloxy compounds (II) can be saponified by treatment with warm aqueous sodium hydroxide to yield 3-hydroxy compounds (III). The 3-acyloxy compounds (II) wherein the acyl radical is a haloacyl radical (e.g., chloroacetyl) can be converted by reaction with an amine (e.g. morpholine), to aminoacyl esters, such as morpholinoacetates.

The 3-hydroxy compounds (III) can be converted to their corresponding 3-chloro derivatives (IV) by treatment with an inorganic acid halide, such as thionyl chloride or phosphorus pentachloride. These 3-chloro derivatives are valuable intermediates for the preparation of the corresponding 3-alkoxy compounds (V); since they react readily with alcohols to form the latter; in addition to their formation by interaction between thionyl chloride and the 3-hydroxy compounds, they are in some instances co-produced during the acid chloride acylation of the 2-one-4 oxides, as discussed above and shown in Example 8 below. These 3-chloro compounds can also be converted to the corresponding 3-hydroxy compounds (III) by warming with water and a mutual solvent, such as acetone or dioxane.

It will be apparent from the disclosure herein to those skilled in the art of organic chemistry that certain of the carbon and nitrogen atoms of the 5-monocyclic aryl-1,4-benzodiazepin-2-one nucleus other than the carbon at the 3-position can be substituted with non-interfering groups instead of hydrogen atoms. Therefore, in the processes of the invention, except for any limitations expressed in this specification, all 5-monocyclic aryl-1,3-dihydro-2H-1,4-benzodiazepin-2-one 4-oxides can be employed as starting materials in the process of making aspect of this invention. Similarly in the 3-oxygenated products the 1-position can be substituted with hydrogen, an alkyl group such as methyl, ethyl, and propyl, an alkenyl group such as allyl and methyl allyl, or a lower aralkyl group such as benzyl and phenylethyl. The benzo-portion of the benzodiazepine nucleus can have one or more substituents other than hydrogen, as for example, lower alkyl, chlorine, bromine, trifluoromethyl or methylsulfonyl at the 6-, 7-, 8-, or 9-positions. The monocyclic aryl in the 5-position can be phenyl, 2-thienyl, 3-thienyl, 2-, 3-, or 4-pyridyl. The aryl nucleus can bear one or more simple substituents inert in the reactions herein described, such as lower alkyl, chlorine, bromine, trifluoromethyl, or methylsulfonyl, and such substituted nuclei are the full equivalents of the unsubstituted nuclei for the purpose of the present invention.

The 5-monocyclic aryl-1,3-dihydro-2H-1,4-benzodiazepin-2-one 4-oxides employed as starting materials in conducting my process are generally known or are readily prepared by procedures known to those skilled in the art.

The best mode contemplated by the inventor of carrying out his invention will now be set forth as follows:

*Example 1*

A. Suspend 10 g. of 7-chloro-1,3-dihydro-5-phenyl-2H-1,4-benzodiazepin-2-one 4-oxide in 150 ml. of acetic anhydride and warm on a steam bath with stirring until all the solid has dissolved. Cool and filter off crystalline, analytically pure 3-acetoxy-7-chloro-1,3-dihydro-5-phenyl-2H-1,4-benzodiazepin-2-one, M.P. 242–3°.

*Analysis.*—Calcd. for $C_{17}H_{13}ClN_2O_3$: C, 62.09; H, 3.98; N, 8.52. Found: C, 62.06; H, 4.13; N, 8.30.

B. Add to a suspension of 3.4 g. of 3-acetoxy-7-chloro-1,3-dihydro-5-phenyl-2H-1,4-benzodiazepin-2-one in 80 ml. of alcohol, 6 ml. of 4 N sodium hydroxide. Allow to stand after complete solution takes place to precipitate a solid. Redissolve the solid by the addition of 80 ml. of water. Acidify the solution with acetic acid to give white crystals. Recrystallize from ethanol to obtain 7-chloro-1,3-dihydro-3-hydroxy-5-phenyl-2H-1,4-benzodiazepin-2-one, M.P. 203–204°.

*Analysis.*—Calcd. for $C_{15}H_{11}ClN_2O_2$: C, 62.81; H, 3.84; N, 9.27; Cl, 12.37. Found: C, 62.57; H, 3.93; N, 9.59; Cl, 12.30.

The manner of using the invention sought to be patented in its process aspect will now be described:

The novel compositions of matter of my invention having a molecular structure in which there is attached to the 3-position of a 5-monocyclic aryl-1,3-dihydro-2H-1,4-benzodiazepin-2-one nucleus a hydroxy group or a group convertible thereto have valuable central nervous system activity. For instance the compounds possess valuable anticonvulsant and muscle-relaxing effects. In addition, they exhibit psycholeptic effects and show anti-anxiety and anti-tension effects without undue sedation or ataxia. Because of their low toxicity they demonstrate a wide margin of safety in both acute and subacute experiments.

From our tests we have found that our compounds show anti-metrazole activity in mice. Likewise, our compounds also possess anti-electroshock activity. A further property exhibited by our composition is anti-morphine activity. Thus demonstrating a pattern of activity associated with potent ataractics of known clinical efficacy.

The toxicity of my compounds was first evaluated acutely in mice and found to be extremely low. Chronic toxicity studies in rats and dogs conducted according to the usual, well-known procedures were made on 7-chloro-3-hydroxy-5-phenyl-1,3-dihydro-2H-1,4-benzodiazepin-2-one and the same low toxicity was observed.

The foregoing pharmacological results were confirmed clinically, representative case histories follow.

J. G.: Female, white, age 38, weight 125 lb. Her husband was involved in an automobile accident and sustained gross injuries requiring continued hospitalization. At the time of the accident, she developed an acute anxiety reaction that persisted. Given 7-chloro-3-hydroxy-5-phenyl-1,3-dihydro-2H-1,4-benzodiazepin-2-one 10 mg. q.i.d., within a week, all symtoms were relieved and she was able to perform household duties with ease.

Diagnosis: reactive anxiety; result: relieved.

B. F.: Female, white, age 22. One and one-half years intermittent acute anxiety episodes, panic proportions, situational phobic reactions, obsessive compulsive ruminations, depression, headache, anorexia and insomnia. Given 7-chloro-3-hydroxy-5-phenyl-1,3-dihydro-2H-1,4-benzodiazepin-2-one 5 mg. t.i.d. initially with no improvement for a week. Increased to 15 mg. t.i.d. with slight improvement for a week. Then increased to 15 mg. q.i.d. with marked relief of all symptoms and increase in her libido.

Diagnosis: psychoneurotic reaction, anxiety with mixed phobic and depressive features, severe intermittent; result: marked improvement.

J. R.: Male, white, age 79, weight 167 lbs. Elderly hypochondriacal hypertensive patient who developed anxiety because of his illnesses requiring active therapy. 7-chloro-3-hydroxy-5-phenyl-1,3-dihydro-2H-1,4-benzodiazepin-2-one 10 mg. t.i.d. administered. After a month, all symptoms of anxiety had disappeared but the hypochondriacal tendency persisted.

Diagnosis: hypertension - hypochondriasis with associated anxiety; result: relieved.

M. D.: Female, age 52, white, weight 210 lbs. Has complained of intermittent gastrointestinal symptoms for years. Epigastric fullness, flatulence and constipation. Repeated barium meal radiographic examinations negative; no loss of appetite or weight noted. 7-chloro-3-hydroxy-5-phenyl-1,3-dihydro-2H-1,4-benzodiazepin-2-one 10 mg. q.i.d. relieves all symptomatology.

Diagnosis: psychophysiological reaction; result: excellent.

The effective dosage of the compounds of this invention depends upon the severity, the stage, and the individual characteristics of each case and will be determined by an attending physician. Generally, a dosage of from 0.10 to about 10 mg. per kg. of body weight per day constitutes the overall range, with a range of about 0.10 to 5 mg. per kg. per day for the preferred compounds.

The products of my invention may be administered parenterally or orally, and may be combined with diluents, solvents, suspending agents, fillers, excipients, adhesives, coloring and flavoring materials, etc., as desired for preparation of convenient dosage forms.

Representative formulations embodying the compositions of Example 1B are:

| Capsule— | Mg. |
|---|---|
| 7-chloro-3-hydroxy-5-phenyl-1,3-dihydro-2H-1,4-benzodiazepin-2-one | 15.0 |
| Powdered corn starch | 150.0 |
| Cab-O-Sil | 7.5 |
| Magnesium stearate | 7.5 |
| Powdered lactose, U.S.P. | 70.0 |
| Total weight | 250.0 |

| Tablet— | |
|---|---|
| 7-chloro-3-hydroxy-5-phenyl-1,3-dihydro-2H-1,4-benzodiazepin-2-one | 15.0 |
| Methocel, 400 cps., U.S.P. | 10.0 |
| Powdered lactose, U.S.P. | 75.0 |
| Corn starch, redried, U.S.P. | 25.0 |
| Magnesium stearate | 3.5 |
| Micro-Cel "C" | 56.5 |
| Total weight | 185.0 |

Suspension (oral)—

| | |
|---|---|
| 7 - chloro-3-hydroxy-5-phenyl-1,3-dihydro-2H-1,4-benzodiazepin-2-one _____ mg__ | 15.0 |
| Veegum plain _____ mg__ | 50.0 |
| Antifoam AF emulsion _____ mg__ | 5.0 |
| Tween 80 _____ mg__ | 5.0 |
| Sorbo _____ ml__ | 2.5 |
| Methylparaben _____ mg__ | 5.0 |
| Propylparaben _____ mg__ | 1.0 |
| Sodium phosphate, dibasic, heptahydrate, mg__ | 17.5 |
| Sodium phosphate, monobasic _____ mg__ | 40.0 |
| Flavor, q.s. | |
| Distilled water, q.s. ad. _____ ml__ | 5.0 |

Reconstitutable suspension (oral)—

| | |
|---|---|
| 7-chloro-3-hydroxy-5-phenyl-1,3-dihydro-2H-1,4-benzodiazepin-2-one _____ mg__ | 15.0 |
| Sucrose, powdered _____ mg__ | 1000.0 |
| Tragacanth–840 _____ mg__ | 50.0 |
| CMC–7HXSP _____ mg__ | 50.0 |
| Sodium benzoate _____ mg__ | 12.5 |
| Sodium propionate _____ mg__ | 12.5 |
| Sodium phosphate, dibasic, heptahydrate, mg__ | |
| Sodium phosphate, monobasic _____ mg__ | 15.0 |
| Flavor, q.s. | |

The above powder is to be dissolved in sufficient water to arrive at a volume of 5.0 ml. prior to administration.

I have also made the composition constituting the invention with other substituents, than as illustrated in Example 1B, and have determined by pharmacological evaluation that the modified compositions so produced possess the same type of activity and low toxicity. Such variations in the molecular structure of the inventive concept as hereinbefore described are, therefore equivalents of the subject matter sought to be patented.

The following examples illustrate additional alternative metods for preparing the preferred embodiment set forth in Example 1 and other compositions of the invention.

Example 2

Prepare 3-acetoxy-1,3-dihydro-5-phenyl-2H-1,4-benzodiazepin-2-one, M.P. 229–31°, from 1,3-dihydro-5-phenyl-2H-1,4-benzodiazepin-2-one 4-oxide according to the procedure of Example 1A.

*Analysis.*—Calcd. for $C_{17}H_{14}N_2O_2$: C, 69.38; H, 4.80; N, 9.51. Found: C, 69.30; H, 4.91; N, 9.64.

Example 3

Prepare 3-acetoxy - 7 - chloro-1,3-dihydro-1-methyl-5-phenyl-2H-1,4-benzodiazepin-2-one, M.P. 262–3°, from 7 - chloro - 1,3 - dihydro-1-methyl-5-phenyl-2H-1,4-benzodiazepin-2-one 4-oxide according to the procedure of Example 1A.

*Analysis.*—Calcd. for $C_{18}H_{15}ClN_2O_3$: C, 63.07; H, 4.41; N, 8.17; Cl, 10.34. Found: C, 63.16; H, 4.57; N, 8.22; Cl, 10.25.

Example 4

Prepare 3 - acetoxy - 7 - bromo-5-(p-chlorophenyl)-1,3 - dihydro-2H-1,4-benzodiazepin-2-one, M.P. 256–7°, from 7 - bromo-5-(p-chlorophenyl)-1,3-dihydro-2H-1,4-benzodiazepin-2-one 4-oxide according to the procedure of Example 1A.

*Analysis.*—Calcd. for $C_{17}H_{12}BrClN_2O_4$: C, 50.07; H, 2.97; N, 6.86; Cl, 8.70; Br, 19.60. Found: C, 50.08; H, 3.08; N, 6.77; Cl, 8.51; Br, 19.18.

Example 5

Prepare 3 - acetoxy - 7 - chloro - 1,3-dihydro-5-(2-thienyl)-2H-1,4-benzodiazepin-2-one, M.P. 269°, from 7-chloro-1,3-dihydro - 5 - (2-thienyl)-2H-1,4-benzodiazepin-2-one 4-oxide according to the procedure of Example 1A.

*Analysis.*—Calcd. for $C_{15}H_{11}ClN_2O_3S$: C, 53.80; H, 3.31; N, 8.37. Found: C, 53.95; H, 3.41; N, 8.17.

Example 6

Prepare 7-chloro - 3 - (α-chloroacetoxy)-1,3-dihydro-5-phenyl-2H-1,4-benzodiazepin-2-one, M.P. 230–1°, from 7 - chloro - 1,3 - dihydro-5-phenyl-2H-1,4-benzodiazepin-2-one 4-oxide and α-chloroacetic anhydride according to the procedure of Example 1A.

*Analysis.*—Calcd. for $C_{17}H_{12}Cl_2N_2O_3$: C, 56.06; H, 3.32; N, 7.70; Cl, 19.47. Found: C, 56.08; H, 3.42; N, 7.43; Cl, 19.40.

Example 7

Prepare 7 - chloro - 3 - (α-chloroacetoxy)-1,3-dihydro-5-phenyl-2H-1,4-benzodiazepin-2-one by the action of chloroacetyl chloride on 7 - chloro-1,3-dihydro-5-phenyl-2H-1,4-benzodiazepin-2-one 4-oxide according to the procedure of Example 1A. This compound is the same as that prepared in Example 6.

Example 8

A. Suspend 5.0 g. of 7-chloro-1,3-dihydro-5-phenyl-2H-1,4-benzodiazepin-2-one 4-oxide in 20 ml. of benzoyl chloride and warm until all the solid dissolves. Add cyclohexane to precipitate a solid and then suspend the solid in warm ethanol to obtain white crystalline 3-benzoxy-7-chloro - 1,3 - dihydro-5-phenyl-2H-1,4-benzodiazepin - 2-one, M.P. 251–2°.

*Analysis.*—Calcd. for $C_{22}H_{15}ClN_2O_3$: C, 67.63; H, 3.87; N, 7.17; Cl. 9.07. Found: C, 67.57; H, 4.05; N, 6.93; Cl, 9.05.

B. To the above alcohol filtrate add water. Collect solid that precipitates and recrystallize from acetonitrile to obtain 7-chloro-1,3-dihydro-3-ethoxy-5-phenyl-2H-1,4-benzodiazepin-2-one, M.P. 225–7° C.

*Analysis.*—Calcd. for $C_{17}H_{15}ClN_2O_2$: C, 64.87; H, 4.80; N, 8.90; Cl, 11.25. Found: C, 64.45; H, 4.69; N, 8.88; Cl, 11.20.

Example 9

Add to a slightly warm suspension of 3.0 g. of 3-acetoxy - 7 - chloro - 1,3 - dihydro - 5 - phenyl-2H-1,4-benzodiazepin-2-one in 150 ml. of ethanol, 4 ml. of 4 N sodium hydroxide solution with stirring. Dissolve all the solid and allow to stand until a thick white solid precipitates out. Filter solid, wash well with water and recrystallize from ethanol. The compound melts at 203° and is identical with the product of Example 1B.

Example 10

Reflux 7 - chloro - 1,3 - dihydro - 3 - hydroxy-5-phenyl-2H-1,4-benzodiazepin-2-one for a few minutes with a five to ten-fold excess of thionyl chloride and then evaporate to dryness. The residue obtained is a partial hydrochloride of 3,7-dichloro-1,3-dihydro-5-phenyl-2H-1,4-benzodiazepin-2-one, M.P. 151–153° C. As a free base, it melts at 179° C. (dec.).

*Analysis.*—Calcd. for $C_{15}H_{10}Cl_2N_2O$: C, 59.03; H, 3.30; Cl, 23.24; N, 9.18. Found: C, 59.57; H, 3.22; Cl, 22.05; N, 9.51.

Example 11

Dissolve 3,7 - dichloro - 1,3 - dihydro - 5 - phenyl-2H-1,4-benzodiazepin-2-one in warm ethanol. After a few minutes add water, precipitating crude 7-chloro-3-ethoxy-1,3 - dihydro-5-phenyl-2H-1,4-benzodiazepin-2-one, filter off, dry, and recrystallize from acetonitrile. The product obtained melts at 224–225° C., and is the same as described in Example 8B.

Example 12

Dissolve 1 g. of 3,7-dichloro-5-phenyl-1,3-dihydro-2H-1,4-benzodiazepin-2-one in 20 ml. of 50% aqueous acetone and warm in a water bath until, after a few minutes, a solid precipitates. Recrystallize this material from alcohol to obtain 7-chloro-3-hydroxy-5-phenyl-1,3-dihydro-2H-1,4-benzodiazepin-2-one, identical with the products of Examples 1B and 9.

Example 13

Reflux a solution of 3.0 g. of 7-chloro-3-(α-chloroacetoxy)-1,3-dihydro-5-phenyl-2H-1,4-benzodiazepin-2-one, 2.2 ml. of morpholine and 75 ml. of ethanol for two hours. On cooling acidify the solution with alcoholic hydrogen chloride. Filter the white 7-chloro-1,3-dihydro-3-(morpholino-acetoxy)-5-phenyl-2H-1,4-benzodiazepin-2-one hydrochloride, M. P. 223–4° C., and wash with ethanol.

*Analysis.*—Calcd. for $C_{21}H_{20}Cl_2N_3O_4$: N, 9.33; Cl, 15.75. Found: N, 9.02; Cl, 15.70.

Example 14

Add 1.0 g. of 7-chloro-5-phenyl-1,3-dihydro-2H-1,4-benzodiazepin-2-one 4-oxide to 20 ml. of ethyl chloroformate, and heat the mixture on the steam bath for 15 minutes. Remove the excess reagent by vacuum evaporation, to obtain a residue of 3,7-dichloro-5-phenyl-1,3-dihydro-2H-1,4-benzodiazepin-2-one, identical with the product of Example 10.

Example 15

Prepare 7-chloro-1,3-dihydro-3-hydroxy-1-methyl-5-phenyl-2H-1,4-benzodiazepin-2-one, M.P. 119–121° C., from 3-acetoxy-7-chloro-1,3-dihydro-1-methyl-5-phenyl-2H-1,4-benzodiazepin-2-one and one equivalent of sodium hydroxide according to the procedure of Example 9.

*Analysis.*—Calcd. for $C_{16}H_{13}ClN_2O_2$: C, 63.92; H, 4.36; N, 9.32. Found: C, 63.78; H, 4.64; N, 9.26.

Example 16

Stir a mixture of 3.4 g. of 7-chloro-3-hydroxy-5-phenyl-1,3-dihydro-2H-1,4-benzodiazepin-2-one, 4 ml. of 4 N sodium hydroxide and 1.4 ml. of dimethylsulfate in 200 ml. of 50% alcohol for two hours and evaporate to dryness in vacuo. Add water and ether and separate the ether layer. Remove solvent and recrystallize the residue from cyclohexane to obtain 7-chloro-1,3-dihydro-3-hydroxy-1-methyl-5-phenyl-2H-1,4-benzodiazepin-2-one, M.P. 119–121° C.

Example 17

Prepare 3-acetoxy-7-chloro-5-(o-chlorophenyl)-1,3-dihydro-2H-1,4-benzodiazepin-2-one, M.P. 262–264° C., from 7-chloro-5-(o-chlorophenyl)-1,3-dihydro-2H-1,4-benzodiazepin-2-one 4-oxide according to the procedure of Example 1A.

*Analysis.*—Calcd. for $C_{17}H_{12}Cl_2N_2O_3$: C, 56.21; H, 3.33; N, 7.71. Found: C, 56.21; H, 3.54; N, 7.40.

Example 18

Prepare 7-chloro-5-(o-chlorophenyl)-1,3-dihydro-3-hydroxy-2H-1,4-benzodiazepin-2-one, M.P. 160–162° C., from 3-acetoxy-7-chloro-5-(o-chlorophenyl)-1,3-dihydro-2H-1,4-benzodiazepin-2-one according to the procedure of Example 9 to isolate as a solvate with 1 mole of ethanol, M.P. 166–168° C.

*Analysis.*—Calcd. for $C_{17}H_{16}Cl_2N_2O_3$: C, 55.60; H, 4.39; N, 7.63. Found: C, 55.68; H, 4.20; N, 7.93.

Example 19

Prepare 7-chloro-5-(o-chlorophenyl)-1,3-dihydro-3-hydroxy-1-methyl-2H-1,4-benzodiazepin-2-one from 3-acetoxy-7-chloro-5-(o-chlorophenyl)-1,3-dihydro-1-methyl-2H-1,4-benzodiazepin-2-one according to the procedure of Example 9.

Example 20

Prepare 7-chloro-5-(o-chlorophenyl)-1,3-dihydro-3-hydroxy-1-methyl-2H-1,4-benzodiazepin-2-one from 7-chloro-5-(o-chlorophenyl)-1,3-dihydro-3-hydroxy-2H-1,4-benzodiazepin-2-one according to the procedure of Example 16, M.P. 192–194° C.

*Analysis.*—Calcd. for $C_{16}H_{12}Cl_2N_2O_2$: C, 57.33; H, 3.61; N, 8.36; Cl, 21.15. Found: C, 57.42; H, 3.44; N, 8.69; Cl, 21.25.

Example 21

Prepare 1,3-dihydro-3-hydroxy-5-phenyl-7-trifluoromethyl-2H-1,4-benzodiazepin-2-one from 3-acetoxy-1,3-dihydro-5-phenyl-7-trifluoromethyl-2H-1,4-benzodiazepin-2-one according to the procedure of Example 9. The latter compound is easily prepared by the process of Example 1A from 1,3-dihydro-5-phenyl-7-trifluoromethyl-2H-1,4-benzodiazepin-2-one 4-oxide, described in South African Patent 60/4,938.

Example 22

Prepare 3-acetoxy-7-chloro-1,3-dihydro-1-ethyl-5-phenyl-2H-1,4-benzodiazepin-2-one from 7-chloro-1,3-dihydro-1-ethyl-5-phenyl-2H-1,4-benzodiazepin-2-one 4-oxide according to the procedure of Example 1A.

Example 23

Prepare 7,8-dichloro-1,3-dihydro-3-hydroxy-5-phenyl-2H-1,4-benzodiazepin-2-one from 3-acetoxy-7,8-dichloro-1,3-dihydro-5-phenyl-2H-1,4-benzodiazepin-2-one according to the procedure of Example 9.

Example 24

Prepare 1,3-dihydro-3-hydroxy-5-(m-fluorophenyl)-7-chloro-2H-1,4-benzodiazepin-2-one from 3-acetoxy-1,3-dihydro-5-(m-fluorophenyl)-7-chloro-2H-1,4-benzodiazepin-2-one according to the procedure of Example 9.

Example 25

Prepare 1,3-dihydro-3-hydroxy-7-nitro-5-phenyl-2H-1,4-benzodiazepin-2-one from 3-acetoxy-1,3-dihydro-7-nitro-5-phenyl-2H-1,4-benzodiazepin-2-one according to the procedure in Example 9. Prepare starting material by the process of Example 1A from the 4-oxide described in South African Patent 60/4,938.

Example 26

Prepare 1-allyl-7-chloro-1,3-dihydro-3-hydroxy-5-phenyl-2H-1,4-benzodiazepin-2-one from 7-chloro-1,3-dihydro-3-hydroxy-5-phenyl-2H-1,4-benzodiazepin-2-one and allyl bromide according to the procedure of Example 16.

Example 27

Prepare 1,3-dihydro-3-hydroxy-7-chloro-5-(o-tolyl)-2H-1,4-benzodiazepin-2-one from 3-acetoxy-1,3-dihydro-7-chloro-5-(o-tolyl)-2H-1,4-benzodiazepin-2-one according to the procedure of Example 9.

Example 28

Prepare 1,3-dihydro-3-hydroxy-7-methylsulfonyl-5-phenyl-2H-1,4-benzodiazepin-2-one from 3-acetoxy-1,3-dihydro-7-methylsulfonyl-5-phenyl-2H-1,4-benzodiazepin-2-one according to the procedure of Example 9.

Example 29

Prepare 1,3-dihydro-3-hydroxy-7-chloro-5-(p-trifluoromethylphenyl)-2H-1,4-benzodiazepin-2-one from 3-acetoxy-1,3-dihydro-7-chloro-5-(p-trifluoromethylphenyl)-2H-1,4-benzodiazepin-2-one according to the procedure of Example 9.

Example 30

Prepare 3-acetoxy-7,9-dichloro-1,3-dihydro-5-phenyl-2H-1,4-benzodiazepin-2-one from 7,9-dichloro-1,3-dihydro-5-phenyl-2H-1,4-benzodiazepin-2-one 4-oxide according to the procedure of Example 1A.

Example 31

Prepare 6-chloro-1,3-dihydro-3-hydroxy-5-phenyl-2H-1,4-benzodiazepin-2-one from 3-acetoxy-6-chloro-1,3-dihydro-5-phenyl-2H-1,4-benzodiazepin-2-one according to the procedure of Example 9.

Example 32

Prepare 1-benzyl-7-chloro-1,3-dihydro-3-hydroxy-5-phenyl-2H-1,4-benzodiazepin-2-one from 7-chloro-1,3-dihydro - 3 - hydroxy-5-phenyl-2H-1,4-benzodiazepin-2-one and benzyl bromide according to the procedure of Example 16.

*Example 33*

Prepare 3-acetoxy-7-chloro-1,3-dihydro-5-(p-methoxyphenyl)-2H-1,4-benzodiazepin-2-one from 7-chloro-1,3-dihydro-5-(p-methoxyphenyl) - 2H - 1,4 - benzodiazepin-2-one 4-oxide according to the procedure of Example 1A.

*Example 34*

To a hot solution of 15 ml. of isopropenyl acetate containing 0.1 g. of p-toluenesulfonic acid add 2.0 of 7-chloro-1,3-dihydro-5-phenyl-2H-1,4-benzodiazepin-2-one 4-oxide and heat the reaction mixture to reflux for 5 minutes. Allow the resultant clear solution to cool and collect the precipitate, 3 - acetoxy-7-chloro-1,3-dihydro-5-phenyl-2H-1,4-benzodiazepin-2-one.

The subject matter which the applicant regards as his invention is particularly pointed out and distinctly claimed as follows:

1. The composition of matter having the 5-monocyclic aryl-1,3-dihydro - 2H - 1,4 - benzodiazepin-2-one nucleus wherein said monocyclic aryl is a member of the group consisting of phenyl, pyridyl and thienyl, and having attached to said nucleus in the 3-position one of the group consisting of hydroxy and carboxylic acyloxy radicals convertible thereto by hydrolysis.

2. The composition of matter of claim 1 wherein the substituent in the 3-position is the hydroxy group.

3. The composition of matter having the 5-monocyclic aryl-1,3-dihydro - 2H - 1,4 - benzodiazepin-2-one nucleus wherein said monocyclic aryl is a member of the group consisting of phenyl, pyridyl, and thienyl, and having attached to said nucleus in the 3-position one of the group consisting of lower alkoxy, phenoxy, and benzyloxy radicals.

4. The composition of matter of claim 1 wherein the substituent in the 3-position is a carboxylic acyloxy group.

5. 3-acetoxy-7-chloro - 1,3 - dihydro-5-phenyl-2H-1,4-benzodiazepin-2-one.

6. 3-acetoxy-1,3-dihydro-5-phenyl - 2H - 1,4 - benzodiazepin-2-one.

7. 3 - acetoxy-7-chloro-1,3-dihydro-1-methyl-5-phenyl-2H-1,4-benzodiazepin-2-one.

8. 3 - acetoxy-7-bromo-5-(p-chlorophenyl)-1,3-dihydro-2H-1,4-benzodiazepin-2-one.

9. 3-acetoxy-7-chloro - 1,3 - dihydro-5-(2-thienyl)-2H-1,4-benzodiazepin-2-one.

10. 7-chloro-3-(α-chloroacetoxy)-1,3-dihydro-5-phenyl-2H-1,4-benzodiazepin-2-one.

11. 3-benzoxy-7-chloro - 1,3 - dihydro-5-phenyl-2H-1,4-benzodiazepin-2-one.

12. 7-chloro - 1,3 - dihydro-3-ethoxy-5-phenyl-2H-1,4-benzodiazepin-2-one.

13. 7-chloro - 1,3 - dihydro-3-(α-morpholino-acetoxy)-5-phenyl-2H-1,4-benzodiazepin-2-one.

14. 7-chloro - 1,3 - dihydro-3-hydroxy-5-phenyl-2H-1,4-benzodiazepin-2-one.

15. 3,7 - dichloro-1,3-dihydro-5-phenyl-2H-1,4-benzodiazepin-2-one.

16. 7-chloro-1,3-dihydro-3-hydroxy-1-methyl-5-phenyl-2H-1,4-benzodiazepin-2-one.

17. 7-chloro - 5 - (o - chlorophenyl) - 1,3 - dihydro-3-hydroxy-2-H-1,4-benzodiazepin-2-one.

18. 7-chloro - 5 - (o - chlorophenyl) - 1,3 - dihydro-3-hydroxy-1-methyl-2H-1,4-benzodiazepin-2-one.

19. The process for preparing a composition of matter having a 5-monocyclic aryl-1,3-dihydro-2H-1,4-benzodiazepin-2-one nucleus, said nucleus having attached thereto in the 3-position a carboxylic acyloxy radical, which comprises acylating a 5-monocyclic aryl-1,3-dihydro-2H-1,4-benzodiazepin-2-one 4-oxide, wherein said monocyclic aryl is a member of the group consisting of phenyl, pyridyl, and five-membered monohetero rings having six pi electrons.

20. The process of claim 19 wherein said 5-monocyclic aryl-1,3-dihydro-2H-1,4-benzodiazepin-2-one 4-oxide has a chlorine substituent at the 7-position.

21. The process for preparing a composition of matter having a 5-monocyclic aryl-1,3-dihydro-2H-1,4-benzodiazepin-2-one nucleus, said nucleus having attached thereto in the 3-position a hydroxy radical which comprises hydrolyzing a 3-carboxylic acyloxy-5-monocyclic aryl-1,3-dihydro-2H-1,4-benzodiazepin-2-one, wherein said monocyclic aryl is a member of the group consisting of phenyl, pyridyl, and five-membered monohetero rings having six pi electrons.

22. The process of claim 21 wherein said 3-acyloxy-5-monocyclic aryl-1,3-dihydro-2H-1,4-benzodiazepin-2-one has a chlorine substituent at the 7-position.

23. The process for preparing a composition of matter having a 5-monocyclic aryl-1,3-dihydro-2H-1,4-benzodiazepin-2-one nucleus, said nucleus having attached thereto in the 3-position a halide atom which comprises treating a 3-hydroxy-5-monocyclic aryl-1,3-dihydro-2H-1,4-benzodiazepin-2-one, wherein said monocyclic aryl is a member of the group consisting of phenyl, pyridyl, and five-membered monohetero rings having six pi electrons, with an inorganic acid halide.

24. The process of claim 23 wherein said 3-hydroxy-5-monocyclic aryl-1,3-dihydro-2H-1,4-benzodiazepin-2-one has a chlorine substituent at the 7-position.

25. The process for preparing a composition of matter having a 5-monocyclic aryl-1,3-dihydro-2H-1,4-benzodiazepin-2-one nucleus, said nucleus having attached thereto in the 3-position one of the group consisting of lower alkoxy and benzyloxy radicals which comprises treating said 3-chloro-5-monocyclic aryl-1,3-dihydro-2H-1,4-benzodiazepin-2-one, wherein said monocyclic aryl is a member of the group consisting of phenyl, pyridyl, and five-membered monohetero rings having six pi electrons, with a lower-alkanol or benzyl alcohol.

26. The process of claim 25 wherein said 3-chloro-5-monocyclic aryl-1,3-dihydro-2H-1,4-benzodiazepin-2-one has a chlorine substituent at the 7-position.

27. The process for preparing a composition of matter having a 5-monocyclic aryl-1,3-dihydro-2H-1,4-benzodiazepin-2-one nucleus, said nucleus having attached thereto in the 3-position a chlorine atom which comprises treating a 5-monocyclic aryl-1,3-dihydro-2H-1,4-benzodiazepin-2-one 4-oxide, wherein said monocyclic aryl is a member of the group consisting of phenyl, pyridyl, and five-membered monohetero rings having six pi electrons, with a carboxylic acyl chloride.

28. The process of claim 27 where said 5-monocyclic aryl-1,3-dihydro-2H-1,4-benzodiazepin-2-one 4-oxide has a chlorine substituent at the 7-position.

29. The process for preparing a composition of matter having a 5-monocyclic aryl-1,3-dihydro-2H-1,4-benzodiazepin-2-one nucleus, said nucleus having attached thereto in the 3-position a halogen atom which comprises treating a 5-monocyclic aryl-1,3-dihydro-2H-1,4-benzodiazepin-2-one 4-oxide, wherein said monocyclic aryl is a member of the group consisting of phenyl, pyridyl, and five-membered monohetero rings having six pi electrons, with a lower alkyl haloformate.

30. The process of claim 29 wherein said 5-monocyclic aryl-1,3-dihydro-2H-1,4-benzodiazepin-2-one 4-oxide has a chlorine substituent at the 7-position.

31. The process for preparing a composition of matter having a 5-monocyclic aryl-1,3-dihydro-2H-1,4-benzodiazepin-2-one nucleus, said nucleus having attached thereto in the 3-position a carboxylic acyloxy radical which comprises treating a 3-chloro-5-monocyclic aryl-1,3-dihydro-2H-1,4-benzodiazepin-2-one, wherein said monocyclic aryl is a member of the group consisting of phenyl, pyridyl, and five-membered monohetero rings having six pi electrons, with an alkali metal salt of a monocarboxylic acid.

32. The process of claim 31 wherein said 3-chloro-5-monocyclic aryl-1,3-dihydro-2H-1,4-benzodiazepin-2-one has a chlorine substituent at the 7-position.

33. The process for preparing a composition of matter having a 5-monocyclic aryl-1,3,-dihydro-2H-1,4-benzodiazepin-2-one nucleus, said nucleus having attached thereto in the 3-position the hydroxy radical which comprises treating a 3-chloro-5-monocyclic aryl-1,3-dihydro-2H-1,4-benzodiazepin-2-one, wherein said monocyclic aryl is a member of the group consisting of phenyl, pyridyl, and five-membered monohetero rings having six pi electrons, with water.

34. The process of claim 33 wherein said 3-chloro-5-monocyclic aryl-1,3-dihydro-2H-1,4-benzodiazepin-2-one has a chlorine substituent at the 7-position.

No references cited.

WALTER A. MODANCE, *Primary Examiner.*

NICHOLAS S. RIZZO, *Examiner.*

R. T. BOND, *Assistant Examiner.*